P. J. LINCOLN.
RECIPROCATING ELECTRIC MOTOR FOR DRILLS.
APPLICATION FILED JAN. 28, 1910.
1,014,495.
Patented Jan. 9, 1912.
3 SHEETS—SHEET 1.
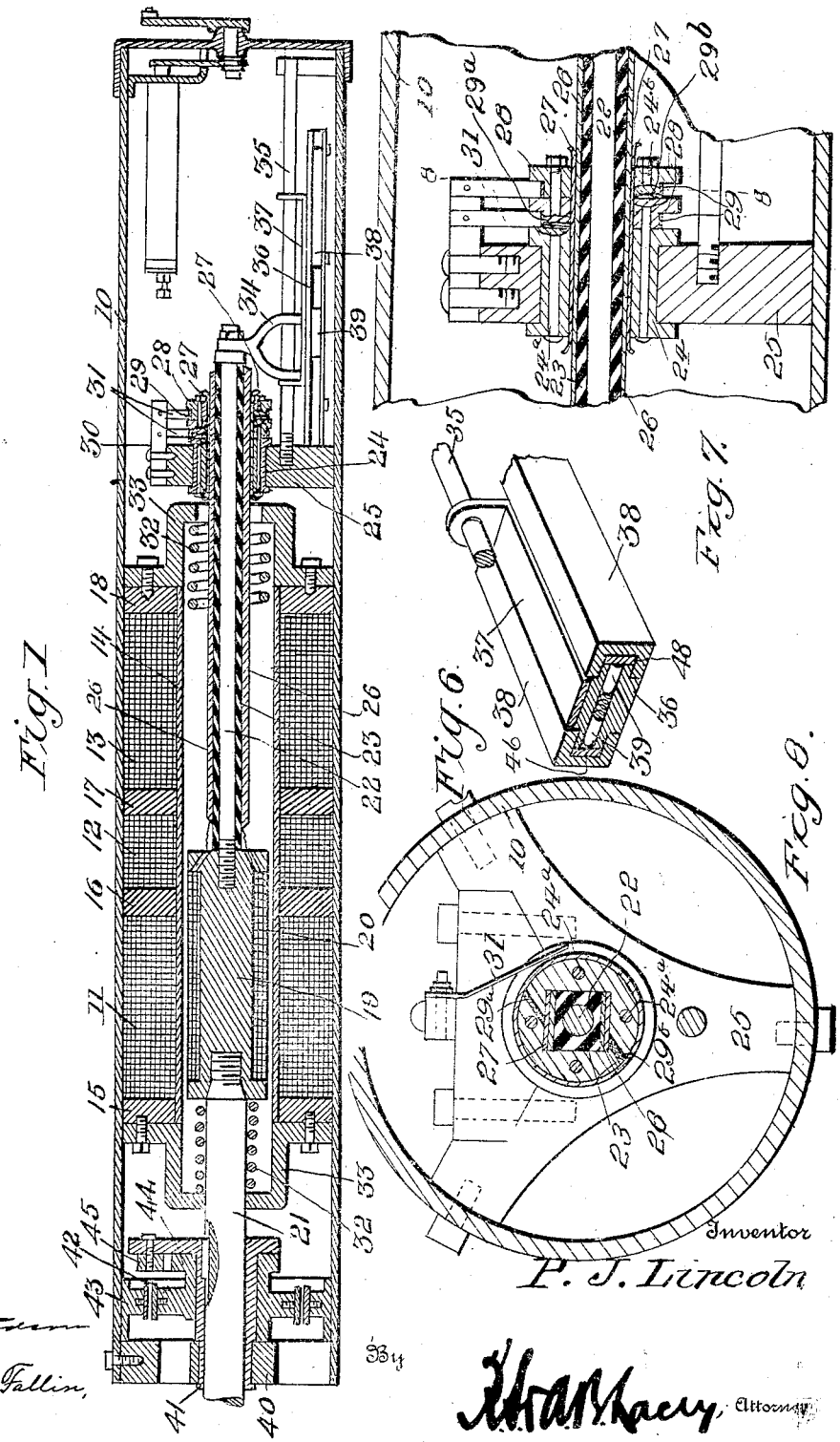
Inventor
P. J. Lincoln

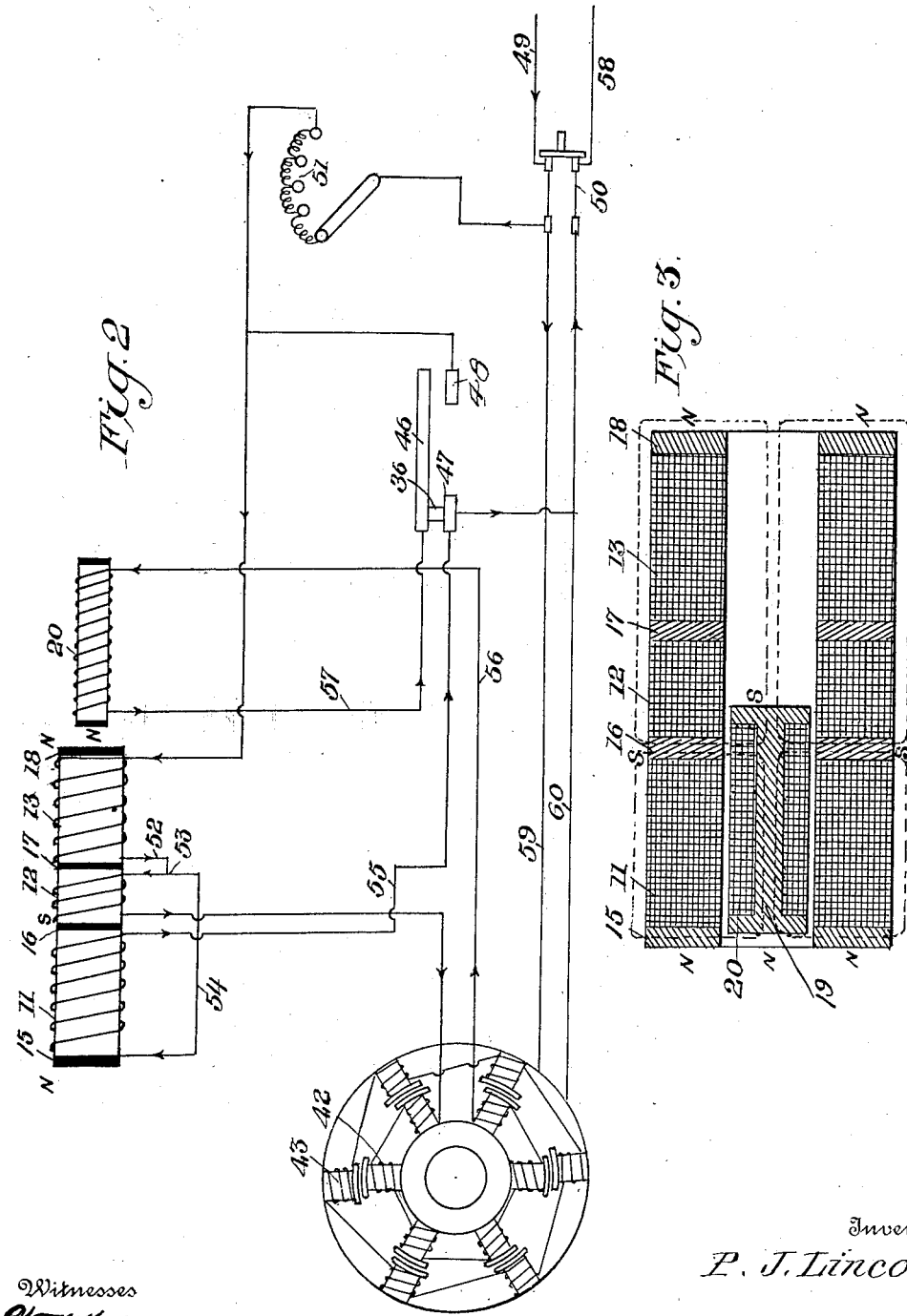

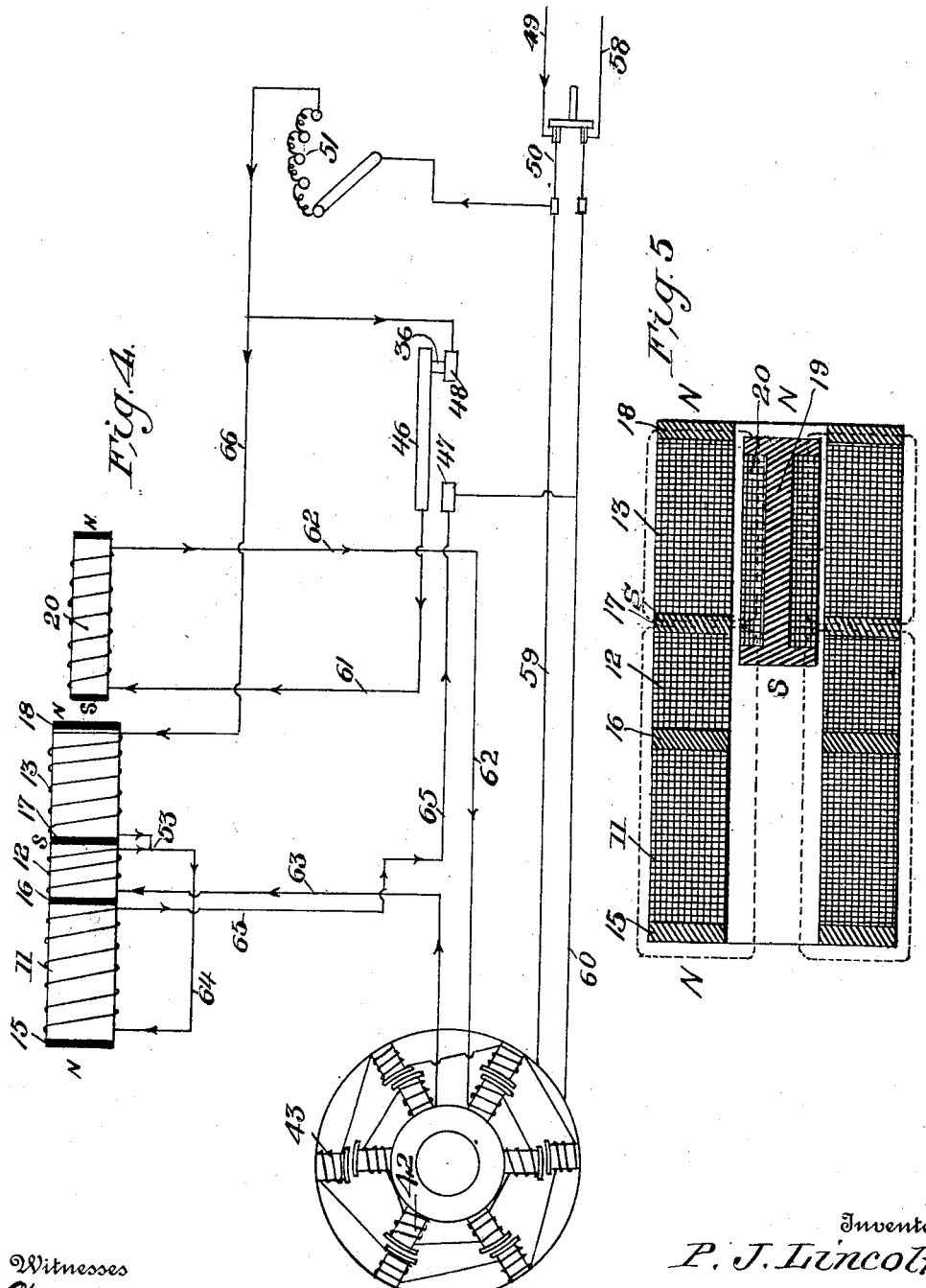

UNITED STATES PATENT OFFICE.

PURD J. LINCOLN, OF BIRMINGHAM, ALABAMA.

RECIPROCATING ELECTRIC MOTOR FOR DRILLS.

1,014,495. Specification of Letters Patent. Patented Jan. 9, 1912.

Application filed January 28, 1910. Serial No. 540,666.

*To all whom it may concern:*

Be it known that I, PURD J. LINCOLN, a citizen of the United States, residing at Birmingham, in the county of Jefferson and State of Alabama, have invented certain new and useful Improvements in Reciprocating Electric Motors for Drills, of which the following is a specification.

This invention relates to electric drills, and refers particularly to a reciprocating motor to actuate the drill and for intermittently rotating the same.

This invention has special reference to an improvement upon Letters Patent No. 942,396, patented December 7, 1909, for a similar device, and has for an object the reduction of the number of magnets which are employed in the field coils to reciprocate the armature by means of which the drill is actuated.

The invention has for a further object the arrangement of the parts in such a manner as to reduce the number of circuits for the operation of the implement from the number which is necessary in the construction of the above referred to patent.

For a full understanding of the invention reference is to be had to the following description and accompanying drawings, in which:—

Figure 1 is a longitudinal central section through the complete drill. Fig. 2 is a diagrammatic view of the circuits necessary for the operation of the drill, the sliding contact of the switch being disposed in the position in which the drill is extended. Fig. 3 is a diagrammatic view of the magnetic field produced when the sliding switch closes the circuits as disclosed in Fig. 2. Fig. 4 is a diagrammatic view of the circuits disclosing the switch or sliding contact in the position which it assumes when the drill is retracted, and Fig. 5 is a diagrammatic view of the magnetic field when the sliding contact is in the position disclosed in Fig. 4. Fig. 6 is an enlarged detail section through the switch of the improved motor. Fig. 7 is a longitudinal central section through the hub and its adjacent parts; Fig. 8 is a transverse section on the line 8—8 of Fig. 7.

Corresponding and like parts are referred to in the following description and indicated in all the views of the accompanying drawings by the same reference characters.

Referring to the drawings the numeral 10 designates the casing in which the improved drill mechanism is mounted, and which is formed from steel or other suitable material by means of which may be formed a magnetic field. Arranged within the casing 10 are field coils 11, 12 and 13, the coils 11 and 13 having resistances of approximately ten ohms each, while the central coil 12 has but a resistance of approximately three and one-third ohms. The coils 11, 12 and 13 are wound upon a suitably formed brass tube 14. The pole pieces of the coils 11, 12 and 13 are formed of soft iron collars 15, 16, 17 and 18, which are arranged at the outer ends of the coils 11 and 13 and between the inner ends of such coils and the central coil 12. These collars which form the poles for the magnets are carried upon the brass tube 14. Mounted to reciprocate within the tube 14 is an armature 19 which carries a suitable coil 20 of a resistance approximating three and one-third ohms.

A drill rod 21 is connected to the forward end of the armature 19 and is extended outwardly from the casing 10 to suitably support the bit employed. The rear end of the armature 19 carries a rod 22 which is extended backwardly therefrom and which is surrounded by a sleeve 23 of insulating material. The sleeve is formed rectangular in cross-section and passes loosely through a hub 24 journaled within a suitable bearing 25. The sleeve 23 is provided upon its opposite faces with strips of conducting material 26 having their inner ends suitably connected to the terminals of the armature coil 20. A pair of contact strips 27 are arranged within the opposite sides of the opening through the hub and bear frictionally against the strips 26 so as to be in constant electrical connection therewith. The hub 24 is provided with detachable end sections 28 in the form of rings which are rabbeted at their inner edges to form annular grooves within which collecting rings 29 are arranged. One of the rings 29 is suitably connected to one of the contact strips 27, by a conductor 29ª while the opposite ring is connected to the opposite strip 27 by a simi- lar conductor 29ᵇ. The hub 24 is provided with longitudinally disposed bolts 24ª passing through the rings of the sections 28 to clamp the same against the outer end of the hub. Suitable clamping nuts 24ᵇ are disposed upon the outer ends of the bolts to retain the same in position. The bearing 25 is provided at its upper portion and above the hub 24 with a brush holder 30 which carries depending brushes 31 for engagement with the collecting rings 29. Buffer springs 32 are employed which are arranged at the opposite ends of the tube 14 and about the drill rod 21 and the slide rod 22 respectively. The springs 32 are supported within suitable housings 33 which are arranged at the opposite ends of the tube 14 and supported upon the end pole pieces 15 and 18. The rear end of the slide rod 22 is provided with a slide 34 which is disposed upon a guide-rod 35 which is suitably supported in the rear end of the casing 10. A brush 36 is slidably disposed beneath the guide-rod 35 and provided with a fork 37 having the arms thereof extended upwardly against the opposite sides of the guide-rod 35 in spaced relation and adapted to be engaged by the slide 34. The brush 36 is slidably disposed between a pair of insulated bars 38 which are provided with contact strips 46, 47 and 48.

The brush 36 is provided with plungers 39 which are in electrical connection with each other and which slidably engage the strips upon the bars 38. The strip 46 is carried by one of the bars 38 and extends substantially the entire length thereof, while the strips 47 and 48 are of reduced length and are arranged upon the opposite bar 38 toward the ends of the same. The forward end of the casing 10 is provided with a bearing 40 which supports the drill operating rod 21. A bushing 41 is journaled within the bearing 40 and surrounds the rod 21, the same having a feather and spline connection therewith to admit of the independent longitudinal movement of the rod 21 therethrough and to cause the rigid rotation of the rod with the bushing 41. The bushing 41 is provided with a rotary armature 42 which is loosely mounted thereon and co-acts with the field 43 rigidly carried within the forward end of the casing 10. The rotary armature 42 is provided with a ratchet 44 for coöperation with a pawl 45 which is carried upon the inner end of the bushing 41 to impart an intermittent rotary movement to the rod 21.

Referring particularly to Fig. 2 in which is disclosed the diagrammatic view of the operating elements of the drill and the wiring thereof, and in which the brush 36 is disclosed in a forward position, or in contact with the strips 46 and 47, the drill rod 21 is in an extended position. In this instance the current is conducted from the main line wire 49 through the switch 50 to a rheostat 51, passing through the same to the field coil 13. From the field coil 13 the current is conducted through a wire 52 to a connection 53 where the current is divided, it flowing through the wire 54 to the field coil 11 and thence to the strip 47 through the wire 55. From the connection 53 the current also flows through the central field coil 12 to the armature coil 42 from which it is conducted through the wire 56 to the coil 20 of the reciprocating armature. The current passes from the coil 20 through the wire 57 to the strip 46 and to the line wire 58 by reason of the connection of the strips 46 and 47 with the brush 36. The field 43 is connected by the wires 59 and 60 in shunt circuit with the main line wires 49 and 58 through the switch 50. From Fig. 3 it will be observed that this path of the current through the operating elements produces a magnetic field in which the reciprocating armature is provided with a north pole at its forward end and a south pole at its rear end. It will also be observed that the armature is at the forward end of the field within the casing 10 and that the pole-piece 15 is formed into a north pole to repel the reciprocating armature. In this instance the pole piece 16 is formed into a south pole to repel the rear end of the reciprocating armature and to cause the movement of the armature into the opposite end of the casing 10. As the armature 19 is drawn backwardly within the casing 10 the rod 22 is carried therewith and moves the slide 34 to strike one of the arms of the fork 37 to carry the brush 36 into contact with the strips 46 and 48.

Referring particularly to Fig. 4, in which is disclosed the brush 36 in contact with the strips 46 and 48 the path of the current is as follows: From the main line wire 49 through the switch 50 to the rheostat 51, thence to the strip 48, through the brush 36 to the strip 46 and outwardly through the wire 61 to the armature coil 20. It will be observed that in the latter instance the current flows through the coil 20 in an opposite direction to that in which it flows when the brush 36 is in contact with the strips 46 and 47. This changes the polarity of the armature coil 20 and produces an opposite effect upon the same within the field of the casing 10 to move the armature into a forward position. From the armature coil 20 the current passes through a wire 62 to the rotary armature 42 from which it is conducted through the wire 63 to the central field coil 12 to the connection 53. The current is divided at the connection 53, the same passing through the wire 64 to the field coil 11 and out through the wire 65 to the main line wire 58. The current also passes from the rheostat 51 through the wire 66 to the field coil 13 and thence to the connection 53. A magnetic field produced by the circuits thus formed is disclosed in a diagrammatic view Fig. 5.

By a comparison of Figs. 3 and 5 it will be observed that the polarity of the armature coil 20 is changed with respect to its ends and that the poles of the central field coil 12 are correspondingly changed so as to effect like poles at the adjacent ends of the field and of the armature to thus repel the armature into the opposite end of the field. The end field coils remain at a constant polarity and alternately repel the opposite ends of the armature incident to the change of the direction of the current through the armature coil 20. It will be noted that the polarity of the field coils 11 and 13 remain the same in both instances, and that the central field coil 12, the rotary armature 42 and the coil 20 of the reciprocating armature will change relative to their polarity so as to produce an opposite magnetic field to force the armature into the forward end of the casing 10.

In the construction of the drill the field coils 11 and 13 are wound to offer a resistance of approximately ten ohms each, while the field coil 12 and the coils of the armatures 42 and 19 are given a resistance approximating three and one-third ohms each.

It will be understood that this motor may be employed to operate not only a drill, but also hammers, pumps, or like devices to which a reciprocatory movement is to be imparted.

In the construction of this drill, or reciprocating motor, it will be noted that the number of magnets or coils within the field to reciprocate the armature are reduced from the number which was disclosed in the prior patent herein above referred to, and that in consequence thereof the circuits have been considerably simplified, so as to provide a device which is believed to be of more practical advantage and one which will be more positive in operation.

Having thus described the invention what is claimed as new is:—

1. A reciprocating electric motor including a central field coil, end field coils at the sides of said central coil, an armature within said field coils for reciprocation therein, an electric circuit introduced through said end coils to produce unchanged polarity thereof, a branch electric circuit from said first circuit introduced through said central coil and said armature, and means for changing the direction of the current of said branch circuit to reciprocate said armature.

2. A reciprocating electric motor including a central field coil, end field coils arranged at the extremities of said central coil, an armature within the field coils for reciprocation therein, a drill operating rod carried by said armature, a rotary armature on said rod to actuate the same, a field arranged about said rotary armature, a main electric circuit including said end field coils for the passage of a circuit therethrough, a shunt circuit over said main circuit including said field, and a branch circuit from the main circuit including said central field coil and said armatures.

In testimony whereof I affix my signature in presence of two witnesses.

PURD J. LINCOLN. [L. S.]

Witnesses:
FRANK S. ANDRESS,
IDA N. HEBERT.